US008941478B2

(12) United States Patent
Mirle et al.

(10) Patent No.: US 8,941,478 B2
(45) Date of Patent: Jan. 27, 2015

(54) SYSTEM FOR PROVIDING A REMINDER TO REMOVE A MOBILE ELECTRONIC DEVICE FROM A VEHICLE

(75) Inventors: Sanjeev C. Mirle, Troy, MI (US); Eric S. Kaufman, Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 217 days.

(21) Appl. No.: 13/435,494

(22) Filed: Mar. 30, 2012

(65) Prior Publication Data
US 2013/0257604 A1 Oct. 3, 2013

(51) Int. Cl.
*B60Q 1/00* (2006.01)

(52) U.S. Cl.
USPC ............ 340/425.5; 340/384.1; 340/933; 340/426.1; 340/430; 340/426.16; 340/426.17; 340/426.2; 340/457; 340/505; 340/539.1; 340/539.13; 340/539.21; 340/539.23; 340/539.32

(58) Field of Classification Search
CPC .................................. B60R 1/12; B60Q 9/00
USPC ............. 340/384.1, 933, 426.1, 430, 426.16, 340/426.17, 426.2, 457, 505, 539.1, 539.11, 340/539.13, 539.21, 539.23, 539.32
See application file for complete search history.

(56) References Cited

U.S. PATENT DOCUMENTS

| | | | |
|---|---|---|---|
| 7,408,445 B1 * | 8/2008 | Cunningham | 340/425.5 |
| 8,065,079 B2 * | 11/2011 | Rogers | 701/516 |
| 8,570,168 B2 * | 10/2013 | Logan et al. | 340/539.32 |
| 2006/0224319 A1 * | 10/2006 | Rogers | 701/213 |
| 2011/0084807 A1 * | 4/2011 | Logan et al. | 340/10.1 |
| 2012/0065882 A1 * | 3/2012 | Rogers | 701/487 |

OTHER PUBLICATIONS

U.S. Appl. No. 13/331,733, filed Dec. 20, 2011.

* cited by examiner

*Primary Examiner* — Daryl Pope
(74) *Attorney, Agent, or Firm* — Cantor Colburn LLP

(57) ABSTRACT

A vehicle system for determining that at least one mobile electronic device is generally stationary and is potentially forgotten is provided. The system includes a vehicle data bus and a control module. The vehicle data bus transmits a signal indicating at least one trigger event. The trigger event indicates a vehicle exit condition. The control module is in communication with the mobile electronic device and the vehicle bus. The control module is in communication with the mobile device through a data connection to receive information. The control module includes control logic for receiving the trigger signal from the vehicle data bus. The control module includes control logic for determining if the mobile electronic device has moved based on information received from the data connection. The control module includes control logic for determining if the mobile electronic device is generally stationary if the trigger signal is received.

19 Claims, 2 Drawing Sheets

SYSTEM FOR PROVIDING A REMINDER TO REMOVE A MOBILE ELECTRONIC DEVICE FROM A VEHICLE

FIELD OF THE INVENTION

Exemplary embodiments of the invention relate to a vehicle system for determining that a mobile electronic device is generally stationary and is potentially forgotten, and, to a method for providing a reminder regarding the mobile electronic device upon an exit event from the vehicle.

BACKGROUND

Many individuals own mobile electronic devices such as, for example, smartphones. Mobile electronic devices typically include features such as voice call or text messaging capability. Mobile electronic devices may also be used as an Internet browser or as a media player. As a result, many individuals feel the need to carry their mobile electronic devices with them almost everywhere they travel. For example, some individuals carry their mobile electronic devices with them at all times of the day in an effort to interact with their business clients.

One problem that may occur is that sometimes individuals may inadvertently forget to take their mobile electronic device with them when leaving their home or their office building. Also, some individuals may accidently leave their mobile electronic device in their vehicle as well. This may result in an individual missing an important telephone call or email message.

In one approach, an individual may purchase a device that provides a reminder or alert in the event the mobile electronic device is forgotten. Specifically, an individual may purchase an electronic pendant that attaches to a keychain. The pendant may be wirelessly connected to the mobile electronic device (e.g., for example through a Bluetooth® connection), and provides an alert in the event the pendant is separated from the mobile electronic device. However, the pendant also incurs additional cost to the individual. Accordingly, it is desirable to provide a cost-effective approach for reminding individuals if they have forgotten their mobile electronic device.

SUMMARY OF THE INVENTION

In one exemplary embodiment of the invention, a vehicle system for determining that at least one mobile electronic device is generally stationary and is potentially forgotten is provided. The system includes a vehicle data bus and a control module. The vehicle data bus transmits a signal indicating at least one trigger event. The trigger event indicates a vehicle exit condition. The control module is in communication with the mobile electronic device and the vehicle bus. The control module is in communication with the mobile device through a data connection to receive information. The control module includes control logic for receiving the trigger signal from the vehicle data bus. The control module includes control logic for determining if the mobile electronic device has moved based on information received from the data connection. The control module includes control logic for determining if the mobile electronic device is generally stationary if the trigger signal is received. Determination if the mobile electronic device is generally stationary is based on if the at least one mobile electronic device has moved. The control module includes control logic for generating a reminder signal if the at least one mobile electronic device is generally stationary and is potentially forgotten.

In another exemplary embodiment of the invention, a method for providing a reminder regarding at least one mobile electronic device is provided. The method comprises establishing a data connection between the mobile electronic device and a control module of the vehicle. The method includes monitoring the data connection by a mobile device control module. The method includes determining if at least one trigger event has occurred by the mobile device control module. The data connection includes a signal indicating the at least one trigger event, where the at least one trigger event indicates a vehicle exit condition. The method includes determining that the reminder should be executed based on if the trigger event has occurred. The method includes generating a reminder regarding the mobile electronic device.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
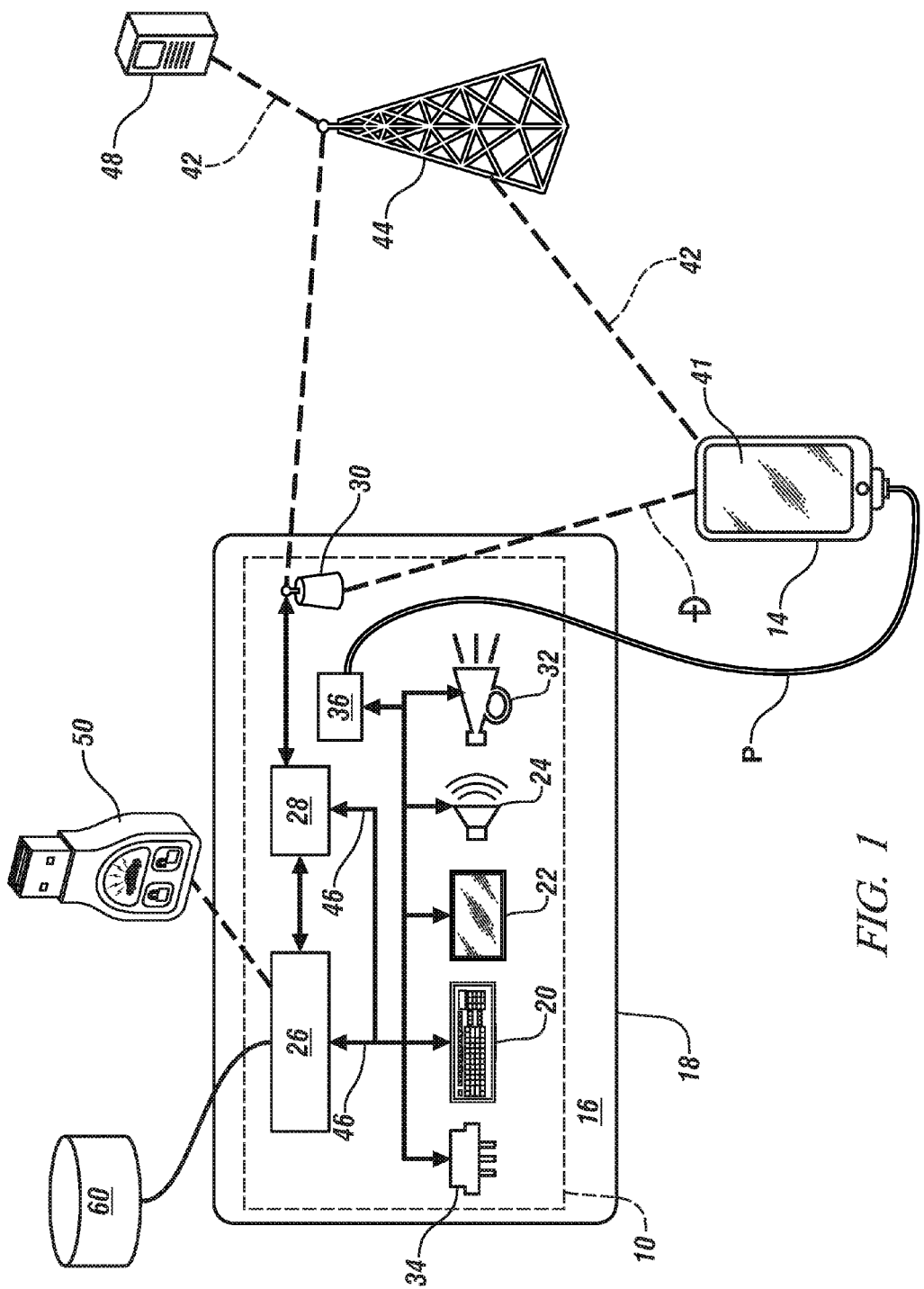
FIG. 1 is a schematic diagram of an exemplary system in a vehicle for providing a reminder regarding a mobile electronic device.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to a vehicle system 10 for providing a reminder regarding at least one mobile electronic device 14 that is selectively located within an interior cabin 16 of a vehicle 18. The vehicle system 10 generally provides a reminder based on a trigger condition or event. The trigger event indicates that a vehicle occupant is either entering or exiting the vehicle 18. The vehicle system 10 includes a user input 20, a display 22, a vehicle audio system including at least one speaker 24, a control module 26, a transceiver 28, an antenna 30, a horn 32, and an ignition switch 34.

The user input 20 of the vehicle 18 may include a keypad or a keyboard for allowing a user to input information. In yet another embodiment, the user input 20 may be a device that is activated by a user's voice. The display 22 may be, for example, a liquid crystal display ("LCD") screen, and is used to display graphics and text. In one embodiment, the user input 20 and the display 22 are a combined unit, where the display is a touchscreen that detects the presence and location of a user's touch.

The control module 26 is in communication with the mobile electronic device 14 through a data connection D. In one exemplary embodiment, the data connection D is a short-range wireless connection. The short-range wireless connection is typically any type of wireless signal for exchanging data over relatively short distances such as, for example, a Bluetooth® signal conforming to IEEE Standard 802.15. In another example, the data connection D is a different kind of radio frequency ("RF") signal such as, for example, a Wi-Fi® signal conforming to IEEE standard 802.11. Alternatively, in another embodiment the data connection D is a wired or data link connection such as, for example, a universal serial bus ("USB").

In addition to the data connection D, the mobile electronic device 14 may also be connected to the vehicle 18 through a physical connection P. In the embodiment as shown in FIG. 1, the physical connection P is an electronic charger, where the mobile electronic device 14 is charged by a vehicle battery 36. However, the physical connection P may be a variety of different devices such as, for example, an inductive charging device, or a docking/charging cradle.

The mobile electronic device 14 is typically any type of portable electronic device that may be connected to the control module 26 through the data connection D. For example, the mobile electronic device 14 may be a smartphone or a personal media player. The mobile electronic device 14 may also be associated with a recognizable code. In one embodiment, the recognizable code may be the device address of the mobile electronic device 14. For example, if Bluetooth® is utilized as the connection between the mobile electronic device 14 and the control module 26, then the recognizable code is the Bluetooth® device address. The mobile electronic device 14 includes a motion sensor 38 (shown in FIG. 2), one or more mobile device control modules 39 (also shown in FIG. 2), and a speaker 40 (also shown in FIG. 2). The motion sensor 38 is generally any type of sensor that is configured for measuring displacement or motion of the mobile electronic device 14, such as one or more axes of rotation, or linear motion (e.g., acceleration). For example, the motion sensor 38 may be a gyroscope or an accelerometer.

In the embodiment as shown, the mobile electronic device 14 may be in communication with a wireless communication network 42. For example, in the embodiment as shown, the network 42 is a cellular network that includes several cellular sites 44 where antennas and electronic communications equipment are placed. The network 42 may also include a remote communications server 48 that is in communication with the cellular sites 44. The remote communications server 48 is configured to receive data from the mobile electronic device 14 though the network 42, interpret the data from mobile electronic device 14, and determine instructions that are sent wirelessly to the control module 26 (though the antenna 30 and the transceiver 28). The remote communications server 48 may be a telecommunications server (e.g., maintained by a telecommunications carrier such as, for example Verizon®) or telematics server (e.g., maintained by a telematics provider such as, for example, OnStar®).

The mobile electronic device 14 may be able to download various mobile applications (e.g., software applications that are configured for being executed by various mobile devices, such as smartphones) from the network 42. In one exemplary embodiment, a mobile application allows the mobile electronic device 14 to communicate with various control modules of the vehicle 18 through the data connection D. It should be noted that although FIG. 1 illustrates the mobile electronic device 14 in communication with the network 42 for directly downloading mobile applications, in another exemplary approach the mobile application may be downloaded to the mobile electronic device 14 remotely. Specifically, the mobile application could be downloaded to a remote device such as, for example, a personal computer or laptop (not illustrated). The mobile application could then be transferred from the remote device to the mobile electronic device 14 (e.g., for example, though a USB connection).

In one approach, various parameters or settings of the mobile application may be modified using the user input 41 of the mobile electronic device 14 (e.g., by pressing the touchscreen). Alternatively, in another approach, various settings of the mobile application may be accessible via a website. Thus, a user may be able to access the website through a remote location (e.g., a home computer), and modify various settings of the mobile application though the website.

In the embodiment as shown, the control module 26 is in communication with the user input 20, the display 22, the speaker 24, the transceiver 28, the antenna 30, the horn 32, and the ignition switch 34, and the vehicle battery 36 through a vehicle data bus 46. Although FIG. 1 illustrates the transceiver 28 and the antenna 30 as separate components from the control module 26, it is to be understood that the transceiver 28 and the antenna 30 may also be integrated with the control module 26 or the transceiver 28 as well.

The control module 26 is also in communication with the wireless communication network 42. For example, in one embodiment, the control module 26 may be a telematics control module or an infotainment control module. The control module 26 may also download various software applications from the network 42. Moreover, although FIG. 1 also illustrates the control module 26 in communication with the network 42, in another exemplary approach the software applications may be downloaded to the control module 26 remotely as well. Specifically, the software application may be downloaded to a remote device such as, for example, a laptop computer. The software application may then be transferred from the remote device to the control module 26. Various parameters or settings of the software application may be modified using the user input 20 of the vehicle 18. Alternatively, in another approach, various settings of the software application may also be accessible via a website as well, where a user may access the website remotely to modify various settings of the software application.

The ignition switch 34 is typically used for connecting a source of power (not shown in FIG. 1) to a propulsion system (not shown in FIG. 1) as well as power that is supplied to one or more control modules of the vehicle 18. For example, the ignition switch 34 may connect a source of power to the control module 26. The ignition switch 34 includes a key-on state (i.e., also referred to as IGN-ON) and a key-off state (also referred to as IGN-OFF). In the key-on state, electrical power is supplied to an engine (not illustrated). In the key-off state, electrical power is not supplied to the engine (not illustrated). It should be noted that while the terms key-on and key-off are used, a key may not be employed with the ignition switch 34 in some embodiments. For example, in one embodiment the ignition switch 34 may be activated by proximity to a fob 50 that is carried by a user instead of a key (e.g., an absence of IGN key or presence of IGN key). Thus, the key-off state exists when power is supplied to the engine and the key-off state exists when power is not supplied to the engine, regardless of whether an actual key is employed.

The vehicle data bus 46 transmits a signal to the control module 26 indicating the trigger event. The trigger event indicates that either a driver or passenger of the vehicle 18 has either entered or exited the vehicle 18. For example, in one embodiment a door sensor (not shown in FIG. 1) is in communication with the vehicle data bus 46. The door sensor determines if a door (not shown in FIG. 1) of the vehicle 18 has been opened or closed. In yet another embodiment, a seat sensor (not shown in FIG. 1) is in communication with the vehicle data bus 46. The seat sensor determines if a driver or a passenger of the vehicle 18 has arisen from a seat (not shown in FIG. 1) located within the vehicle 18. Specifically, for example, the seat sensor may generate a change of occupant seat presence signal indicating that an occupant has arisen from a seat (e.g., a TRUE or 1 signal may switch to a FALSE or 0 signal once the occupant leaves the seat). In another alternative embodiment, a remote door lock module that is part of a keyless entry system is in communication with the vehicle data bus 46. The remote door lock module includes control logic for determining if the doors (not shown) of the vehicle 18 have been locked remotely by a portable unit such as, for example, the fob device 50. In still another embodiment, the trigger event may be the key-off state (IGN-OFF) as indicated by the ignition switch 34.

In one approach, multiple trigger events may need to occur before the control module 26 determines that either a driver or passenger of the vehicle 18 has either entered or exited the vehicle 18, or is about to do so. For example, the control module 26 may determine that a driver or passenger has exited the vehicle 18 if the seat sensor generates the change of occupant seat presence signal, and if the door sensor determines that a door of the vehicle 18 has opened. In another example, the control module 26 may determine that the doors of the vehicle 18 have been closed as well as locked. In yet another example, the control module 26 may determine that the doors have been closed or locked, and a vehicle alarm system (not illustrated) has been activated.

The vehicle system 10 may also include at least one indicator for providing a notification or a reminder to a vehicle occupant. For example, the at least one indicator may be the display 22, the speaker 24, or the horn 32. For example, the control module 26 may include control logic for sending a graphic signal through the vehicle data bus 46 and to the display 22. The display 22 then shows the notification or reminder (e.g., the display 22 may show a message such as "your telephone is in the vehicle"). In another embodiment, the control module 26 sends a signal to the horn 32 for providing an indicator. Specifically, for example, the horn 32 could emit a short tone or beep. In yet another embodiment, the control module 26 may send an audio signal through the vehicle data bus 46 to the speaker 24, where the speaker 24 emits a tone or voice command. In still another embodiment, the at least one indicator may be, for example, an interior or exterior lighting system of the vehicle (not illustrated). For example, the headlights (not shown) of the vehicle 18 may intermittently flash to provide an indicator. In yet another embodiment, the at least one indicator may be an audio or visual indicator of the mobile electronic device 14 (e.g., the speaker 40 as shown in FIG. 2).

In one embodiment of the vehicle system 10, the control module 26 may determine if a specific mobile electronic device 14 that is usually located within the interior cabin 16 has been forgotten by a user. The control module 26 may also determine if the mobile electronic device 14 has been left within the interior cabin 16 of the vehicle 18 after the trigger event has occurred (e.g., a driver or passenger has exited the vehicle 18). For example, a software application that is downloaded from the network 42 (or from a remote device and then to the control module 26) may be executed by the control module 26 to determine if the mobile electronic device 14 is either forgotten by a user, and/or is being left within the interior cabin 16 of the vehicle. The control module 26 may also include control logic for activating the at least one indicator (e.g., the display 22, the speaker 24, the horn 32, the interior vehicle lighting, or the exterior vehicle lighting) of the vehicle system 10 to provide notification indicating that the mobile electronic device 14 is either being forgotten or is left within the interior cabin 16.

In one embodiment, the vehicle system 10 may provide a reminder if a specific mobile electronic device 14 that is usually located within the interior cabin of the vehicle 18 is not present within the interior cabin 16 of the vehicle 18 after the vehicle 18 has been activated. Activation of the vehicle 18 typically means that the vehicle 18 may be manipulated by a driver. Vehicle activation may include, for example, the key-on state or IGN-ON state. In another embodiment, vehicle activation may include a plurality of driver intent sensors (not shown in FIG. 1) that indicate that a shift lever (also not shown in FIG. 1) of the vehicle 18 is in a position other than "P". Thus, in the event a user inadvertently leaves his or her mobile electronic device 14 in his or her house instead of bringing the mobile electronic device 14 to the interior cabin 16 of the vehicle 18, the vehicle system 10 is configured for providing a reminder. That is, the control module 26 includes control logic for activating at least one indicator to notify a driver that the specific mobile electronic device 14 is not located within the interior cabin 16 of the vehicle 18 after the vehicle has been activated, and has likely been forgotten.

Figure 2:
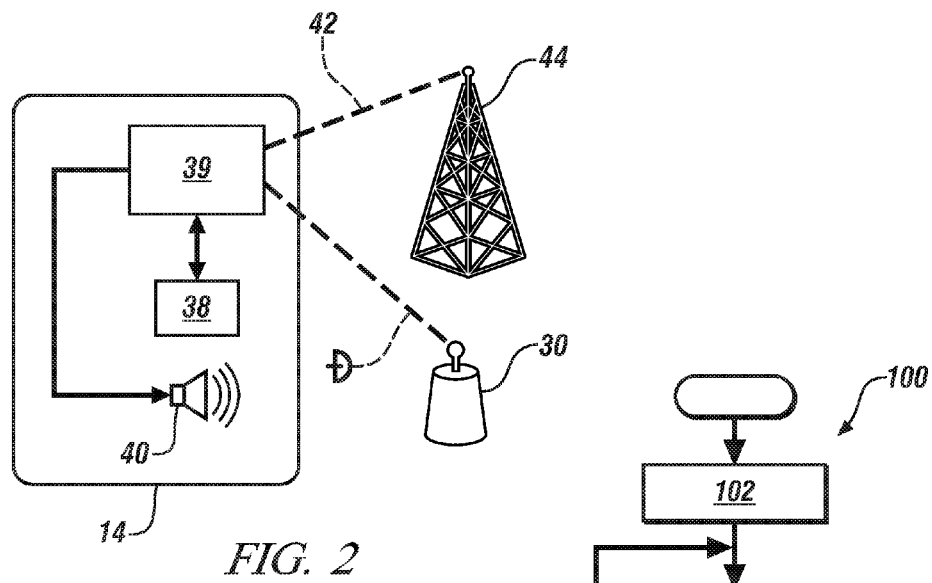
FIG. 2 is a schematic diagram of the mobile electronic device shown in FIG. 1.

In one approach to determine if a mobile electronic device 14 that is typically located within the interior cabin of the vehicle 18 after the vehicle 18 is activated is not present, the control module 26 may include a database 60 (illustrated in FIG. 2). The database 60 stores at least one recognizable code of a mobile electronic device that has previously established communication with the control module 26 though the data connection D. For example, if the short-range wireless connection is a Bluetooth® connection, then the control module 26 and the mobile electronic device have been paired together in the past. Upon activation of the vehicle 18 (e.g., the key-on state or IGN-ON state) the control module 26 attempts to establish a connection though the data connection D to at least one mobile electronic device. If no connection may be established, or if none of the recognizable codes stored in the database 60 match the recognizable code of the mobile electronic device 14 that is currently in communication with the control module 26, this may be an indication that the specific mobile electronic device 14 that is usually located within the interior cabin of the vehicle 18 after the vehicle 18 is activated is not present.

Alternatively, in another embodiment, the control module 26 may determine if the mobile electronic device 14 has been left within the interior cabin 16 of the vehicle 18 after the trigger event has occurred (e.g., if the door has opened, IGN-OFF, an absence of IGN key, etc., which indicate that a driver or passenger has exited the vehicle 18). That is, the control module 26 determines that the mobile electronic device 14 is generally stationary. Thus, a user has potentially forgotten the mobile electronic device 14, which still remains within the interior cabin 16 of the vehicle 18. The trigger event is generally transmitted by one or more signals received by the control module 26 though the vehicle data bus 46. The control module 26 may include control logic for activating the at least one indicator to provide notification that the mobile electronic device 14 is stationary, and is potentially being forgotten (e.g., through the display 22, the speaker 24, the horn 32, etc.). Specifically, the control module 26 generates a reminder signal that is sent over the vehicle data bus 46. The reminder signal is configured to activate the at least one indicator (e.g., to cause a message to be shown on the display 22, to emit an audio signal though the speaker 24, to activate the horn 32, etc.).

Several approaches exist for determining if the mobile electronic device 14 is stationary, and has potentially been forgotten after the trigger event has occurred. For example, the control module 26 may determine if the mobile electronic device 14 is stationary based on a movement signal generated by the motion sensor 38. Specifically, the data connection D may include the movement signal generated by the motion sensor 28. The movement signal indicates displacement or movement of the mobile electronic device 14 (e.g., along one or more axes of rotation or linear motion). In one embodiment, the control module 26 may monitor the movement signal received by the data connection D for a predetermined amount of time (e.g., in one embodiment for about two seconds). If the movement signal indicates generally continuous motion of the mobile electronic device 14 for the predetermined amount of time, this is an indication that an individual is removing his or her mobile electronic device 14 from the interior cabin 16 of the vehicle 18, and thus the mobile electronic device 14 has not been forgotten. In another approach, if the movement signal indicates that the mobile electronic device 14 has negligible or no motion for the predetermined amount of time, this is an indicator that the mobile electronic device 14 remains within the interior cabin 16 of the vehicle 18, and has been forgotten by a user.

In another approach to determine if the mobile electronic device 14 is stationary and is potentially forgotten, if the data connection D is a wireless connection, then the control module 26 determines a variation in the signal strength between the antenna 30 and the mobile electronic device 14. In one embodiment, the control module 26 may determine if the mobile electronic device 14 has been moved by a user if the signal strength between the antenna 30 and the mobile electronic device 14 is non-static (e.g., increases or decreases), and has changed by a specific amount during a predetermined amount of time.

For example, in one approach to determine the variation in signal strength, the control module 26 may include a received signal strength indictor ("RSSI") circuit that measures the incoming wireless connection for a predetermined amount of time after the trigger event (e.g., in one embodiment the maximum predetermined amount of time is about 15 seconds). A received ("RX") power level of the wireless connection is determined based on an RSSI value. The control module 26 may determine if the RX power level drops below a Golden Receiver Power Range ("GRPR") during the predetermined amount of time. The GRPR is regarded as the normal power level of the mobile electronic device 14 at the time of pairing between the mobile electronic device 14 and the control module 26 (the GRPR may vary depending on the specific mobile device). In one embodiment, the control module 26 determines if the mobile electronic device 14 has been removed from the interior cabin 16 of the vehicle 18 based on whether the RX power level has dropped below the GRPR during the predetermined amount of time.

In another approach, the control module 26 monitors the RX power level of the wireless connection, and determines if the RX power level diminishes during the predetermined amount of time (e.g., the signal strength becomes weaker over time). The diminishing RX power level generally indicates that the mobile electronic device 14 is being moved away from the vehicle 18 by a user, and will eventually be moved outside of the interior cabin 16. Alternatively, in another embodiment, if the data connection D is a wired connection the control module 26 may include connection detection circuitry (not shown) to determine the presence or absence of a wired connection (e.g., a USB connection). The absence of the wired connection indicates that a user has unplugged and removed the mobile electronic device 14 from the interior cabin 16.

In one approach, the control module 26 may determine that the mobile electronic device 14 has been moved based on both the movement signal as well as the RX power level of the wireless connection (or the presence or absence of the data connection D if a wired connection is employed). That is, if the movement signal indicates more than a negligible amount motion of the mobile electronic device 14, and if the RX power level of the wireless connection varies or changes during the predetermined amount of time, this indicates that the mobile electronic device 14 is removed from the interior cabin of the vehicle 18.

In yet another embodiment, the mobile device control module 39 (shown in FIG. 2) includes control logic for determining if a reminder should be executed regarding the mobile electronic device 14. For example, a mobile application may be downloaded (e.g., either directly from the network 42 or through a remote device) that executes a reminder to a user to remember his or her mobile electronic device 14 when exiting the vehicle 18. Referring now to FIGS. 1-2, the transceiver 28 is in communication with the vehicle data bus 46. The mobile device control module 39 receives information from the vehicle data bus 46 (e.g., the trigger signal) through the data connection D. For example, the mobile electronic device 14 may include one or more antennas (not shown) in communication with the mobile device control module 39, and sized to receive the data connection D.

Once the mobile device control module 39 receives the trigger signal from the vehicle 18 indicating that the trigger event has occurred, the mobile device control module 39 may then generate a reminder. Specifically, the reminder will alert a driver or passenger of the vehicle 18 who has exited the vehicle 18 to recover his or her mobile electronic device. For example, in one approach, the control module 39 may generate a reminder through the speaker 40 of the mobile electronic device 40. The speaker 40 may emit a tone, or a voice reminder (e.g., a voice reciting "your telephone is in the vehicle").

In another embodiment, once the mobile device control module 39 receives the trigger signal from the vehicle 18 indicating that the trigger event has occurred, a reminder is generated via the at least one indicator in the vehicle 18 (e.g., the display 22, the speaker 24, a control module 26, or the horn 32). Specifically, if the mobile device control module 39 receives the trigger signal, a signal may be sent over the network 42, and to the remote communications server 48. The remote communications server 48 interprets the signal from the mobile electronic device 14, and sends an activation signal through the network 42 to the control module 42. The activation signal will activate the indicator in the vehicle 18 (e.g., a message on the display 22, an audio signal to the speaker 24, etc.).

Figure 3:
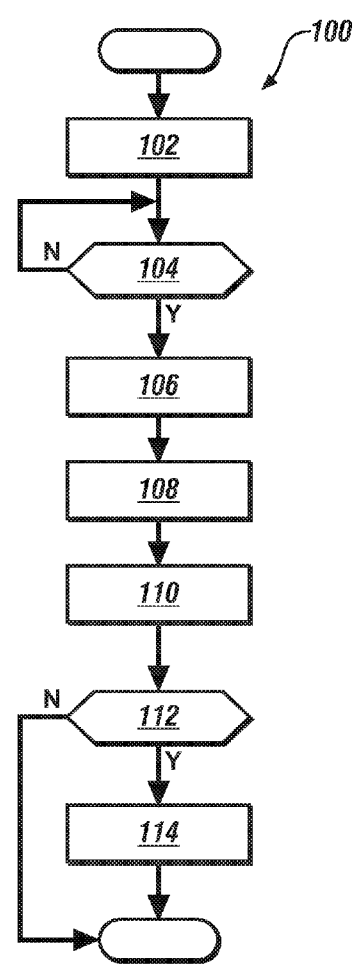
FIG. 3 is a process flow diagram illustrating a method of operating the system shown in FIG. 1.

A method of operating the vehicle system 10 will now be explained. FIG. 3 illustrates an exemplary process flow diagram illustrating the vehicle system 10 providing a reminder in the event the mobile electronic device 14 is stationary and is potentially forgotten within the interior cabin 16 of the vehicle 18, and is generally indicated by reference number 100. Specifically, in the embodiment as shown in FIG. 3, the control module 26 of the vehicle 18 determines if the mobile electronic device 14 has been forgotten within the interior cabin 16. Referring now to FIGS. 1-3, process 100 begins at step 102, the data connection D between the mobile electronic device 14 and the control module 26 is established. Process 100 may then proceed to step 104.

In step 104, the control module 26 monitors the vehicle data bus 46 for one or more trigger events, which indicate that either a driver or passenger of the vehicle 18 has exited the vehicle 18. In one embodiment, multiple trigger events may need to occur before the control module 26 determines that either a driver or passenger of the vehicle 18 has exited the vehicle 18. Process 100 continues to monitor the vehicle data bus 46 until the trigger event has occurred. Once the trigger event occurs, process 100 may then proceed to step 106.

In step 106, where the control module 26 monitors the vehicle data bus 46 to determine if the physical connection P between the mobile electronic device 14 and the vehicle 18 exists. It should be noted that step 106 is an optional step, and may be omitted in some embodiments. Process 100 may then proceed to step 108.

In step 108, the control module 26 determines if the signal strength between the antenna 30 and the mobile electronic device 14 has varied over the predetermined amount of time. For example, in one embodiment, the control module 26 may determine if the RX power level drops below the GRPR. In another approach, the control module 26 monitors the RX power level of the wireless connection, and determines if the RX power level diminishes during the predetermined amount of time (e.g., the signal strength becomes weaker over time). Alternatively, in another embodiment, if the data connection D is a wired connection the control module 26 may include connection detection circuitry (not shown) to determine the presence or absence of a wired connection (e.g., a USB connection). It should be noted that step 108 is an optional step, and may be omitted in some embodiments. Process 100 may then proceed to step 110.

In step 110, the control module 26 determines movement of the mobile electronic device 14. For example, in one embodiment, the control module 26 monitors the data connection D for the movement signal generated by the motion sensor 38. Specifically, movement of the mobile electronic device 14 may be based solely on the movement signal generated by the motion sensor 28. In another approach, a variation in the signal strength between the antenna 30 and the mobile electronic device 14 indicates movement of the mobile electronic device 14 outside of the vehicle 18. In yet another approach, the determination of whether the mobile electronic device 14 is still located within the vehicle 18 is based on both the movement signal as well as the RX power level of the wireless connection. Specifically, if the movement signal indicates more than a negligible amount motion of the mobile electronic device 14, and if the RX power level of the wireless connection has varied by the specific amount during the predetermined amount of time, this indicates that the mobile electronic device 14 is not stationary and has not been forgotten. Process 100 may then proceed to step 112.

In step 112, the control module 26 determines if the mobile electronic device 14 is stationary and has potentially been forgotten by a user based on movement of the mobile electronic device 14. That is, if movement is determined by the control module 26, this is an indication that a user has removed his or her mobile electronic device 14 from the interior cabin 16 of the vehicle 18. If the control module 26 determines that the mobile electronic device 14 is not stationary and has not been forgotten, process 100 may then terminate. If the control module 26 determines that the mobile electronic device 14 is stationary and has been forgotten, process 100 may then proceed to step 114.

In step 114, the control module 26 generates the reminder signal that is sent over the vehicle data bus 46. The reminder signal is configured to activate the at least one indicator (e.g., to cause a message to be shown on the display 22, to emit an audio signal though the speaker 24, to activate the horn 32, or to emit an audio signal over the speaker 40 of the mobile electronic device 14, etc.). Process 100 may then terminate.

Figure 4:
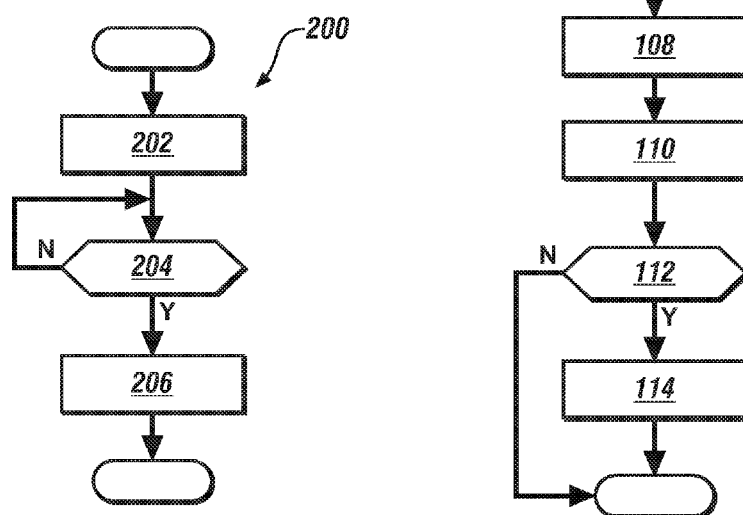
FIG. 4 is a process flow diagram illustrating an alternative embodiment of a method of operating the system shown in FIG. 1.

FIG. 4 illustrates an alternative embodiment of a process flow diagram illustrating the vehicle system 10 providing an alert or a reminder to a user regarding his or her mobile electronic device 14, and is generally indicated by reference number 200. Specifically, in the embodiment as shown in FIG. 4, the mobile device control module 39 (FIG. 2) determines if a reminder should be executed regarding the mobile electronic device 14 if the mobile electronic device 14 is stationary. Referring now to FIGS. 1-2 and 4, process 200 begins at step 202, where the data connection D between the mobile electronic device 14 and the control module 26 is established. Process 200 may then proceed to step 204.

In step 204, the mobile device control module 39 monitors the data connection D for the trigger signal. Once the mobile device control module 39 receives the trigger signal from the vehicle 18 indicating that the trigger event has occurred, this indicates that a reminder should be provided to a user. Process 200 may then proceed to step 206.

In step 206, a reminder or alert is executed. For example, in one approach, the control module 39 may generate a reminder through the speaker 40 of the mobile electronic device 40. In another embodiment, the reminder is generated via the at least one indicator in the vehicle 18 (e.g., the display 22, the speaker 24, a control module 26, or the horn 32). Process 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A vehicle system for determining that at least one mobile electronic device is generally stationary and is potentially forgotten, the system comprising:
   a vehicle data bus transmitting a signal indicating at least one trigger event, the at least one trigger event indicating a vehicle exit condition;
   a control module in communication with the at least one mobile electronic device and the vehicle bus, the control module in communication with the at least one mobile device through a data connection to receive information regarding the at least one mobile electronic device, the control module including:
   a control logic for receiving the at least one trigger signal from the vehicle data bus;
   a control logic for determining if the at least one mobile electronic device has moved based on information received from the data connection;
   a control logic for determining, upon receiving the at least one trigger signal, if the at least one mobile electronic device is generally stationary based on determining if the at least one mobile electronic device has moved; and a control logic for generating a reminder signal indicating that the at least one mobile electronic device is generally stationary and is potentially forgotten, wherein the at least one mobile electronic device connects to a network, wherein a mobile application is downloaded to the at least one mobile electronic device to monitor the data connection for the at least one trigger event.

2. The vehicle system as recited in claim 1, wherein a wireless connection is provided between the at least one mobile electronic device and the control module, and wherein the control module determines a signal strength of the wireless connection.

3. The vehicle system as recited in claim 2, wherein determination of movement of the at least one mobile electronic device is based on determining if the signal strength between the control module and the at least one mobile electronic device has varied.

4. The vehicle system as recited in claim 3, wherein the control module determines that the at least one mobile electronic device is not generally stationary and is not potentially forgotten if a received ("RX") power level of a wireless connection is below a Golden Receiver Power Range ("GRPR").

5. The vehicle system as recited in claim 3, wherein the control module determines that the at least one mobile electronic device is not generally stationary and is not potentially forgotten if a received ("RX") power level diminishes over a predetermined amount of time.

6. The vehicle system as recited in claim 1, wherein the control module is in communication with the at least one mobile electronic device through a wired connection, and wherein determination of movement of the at least one mobile electronic device is based on a presence or absence of the wired connection.

7. The vehicle system as recited in claim 1, wherein the trigger event is one of a door of the vehicle opening, a seat sensor indicating a change of occupant seat presence, if the door has been remotely locked by a portable unit, and a key-off state as indicated by an ignition switch.

8. The vehicle system as recited in claim 1, wherein the control module further includes control logic for determining if the at least one mobile electronic device is generally stationary and is potentially being forgotten upon receiving multiple trigger events through the vehicle data bus.

9. The vehicle system as recited in claim 1, wherein the reminder signal activates at least one of a vehicle display, a speaker that is part of a vehicle sound system, a horn, an interior vehicle lighting system, and an exterior vehicle lighting system.

10. The vehicle system as recited in claim 1, wherein the data connection includes a movement signal generated by a motion sensor of the at least one mobile electronic device, and wherein the control module determines that the at least one mobile electronic device is not generally stationary and is not potentially forgotten if the movement signal indicates generally continuous motion of the at least one mobile electronic device for a predetermined amount of time.

11. The vehicle system as recited in claim 1, wherein the data connection includes a movement signal generated by a motion sensor of the at least one mobile electronic device, and wherein the control module determines that the at least one mobile electronic device is generally stationary and is potentially forgotten if the movement signal indicates that the at least one mobile electronic device has substantially no motion for a predetermined amount of time.

12. The vehicle system as recited in claim 11, wherein the motion sensor is at least one of a gyroscope and an accelerometer.

13. The vehicle system as recited in claim 1, wherein the control module further includes control logic for monitoring the vehicle data bus for a physical connection between the at least one mobile electronic device and the vehicle.

14. A method for providing a reminder regarding at least one mobile electronic device, the method comprising:

establishing a data connection between the at least one mobile electronic device and a control module of the vehicle;

monitoring the data connection by a mobile electronic device control module;

determining whether at least one trigger event has occurred by the mobile electronic device control module, wherein the data connection includes a signal indicating the at least one trigger event, and wherein the at least one trigger event indicates a vehicle exit condition;

determining that a reminder should be executed based on determining that the at least one trigger event has occurred;

generating a reminder regarding the at least one mobile electronic device; and connecting the at least one mobile electronic device to a network, wherein a mobile application is downloaded to the mobile electronic device control module to monitor the data connection for the at least one trigger event.

15. The method as recited in claim 14, comprising executing the reminder by the at least one mobile electronic device.

16. The method as recited in claim 15, wherein the at least one mobile electronic device includes a speaker, and wherein the speaker executes the reminder.

17. The method as recited in claim 14, comprising executing the reminder by at least one vehicle system of the vehicle.

18. The method as recited in claim 17, wherein the reminder is executed by at least one of a vehicle display, a speaker that is part of a vehicle sound system a horn, an interior vehicle lighting system, and an exterior vehicle lighting system.

19. A vehicle system for determining that at least one mobile electronic device is generally stationary and is potentially forgotten, the system comprising:

a vehicle data bus transmitting a signal indicating at least one trigger event, the at least one trigger event indicating a vehicle exit condition;

a control module in communication with the at least one mobile electronic device and the vehicle bus, the control module in communication with the at least one mobile device through a data connection to receive information regarding the at least one mobile electronic device, the control module including:

a control logic for receiving the at least one trigger signal from the vehicle data bus;

a control logic for determining if the at least one mobile electronic device has moved based on information received from the data connection;

a control logic for determining, upon receiving the at least one trigger signal, if the at least one mobile electronic device is generally stationary based on determining if the at least one mobile electronic device has moved; and a control logic for generating a reminder signal indicating that the at least one mobile electronic device is generally stationary and is potentially forgotten, the reminder signal activating an exterior vehicle lighting system, wherein the at least one mobile electronic device connects to a network, wherein a mobile application is downloaded to the at least one mobile electronic device to monitor the data connection for the at least one trigger event.

* * * * *